United States Patent [19]

Cannon et al.

[11] Patent Number: 4,867,310

[45] Date of Patent: Sep. 19, 1989

[54] CASSETTE TAPE HOLDER

[76] Inventors: Richard K. Cannon, 1340 Lombard St., #303; Robert S. Jaret, 2846 Polk St., both of San Francisco, Calif. 94109

[21] Appl. No.: 84,694

[22] Filed: Aug. 11, 1987

[51] Int. Cl.⁴ ............................................. B65D 85/672
[52] U.S. Cl. ................................... 206/387; 206/232; 206/425; 206/460
[58] Field of Search ......................... 206/232, 309–313, 206/387, 425, 444, 460, 472–475, 807; 281/31

[56] References Cited

U.S. PATENT DOCUMENTS

| | | | |
|---|---|---|---|
| 3,372,858 | 3/1968 | Brody | 281/31 |
| 3,583,729 | 6/1971 | De Groot | 206/232 |
| 3,604,556 | 9/1971 | Schwartz . | |
| 3,829,132 | 8/1974 | Willieme . | |
| 4,004,689 | 1/1977 | Glasell | 206/387 |
| 4,125,189 | 11/1978 | Fujimoto et al. . | |
| 4,290,524 | 9/1981 | Azar . | |
| 4,307,806 | 12/1981 | Haubert . | |
| 4,433,780 | 2/1984 | Ellis | 206/387 |
| 4,438,846 | 3/1984 | Stylianou | 206/387 |

FOREIGN PATENT DOCUMENTS

| | | | |
|---|---|---|---|
| 2257193 | 9/1975 | France | 206/425 |
| 2030545 | 4/1980 | United Kingdom | 206/387 |
| 2093790 | 9/1982 | United Kingdom | 206/387 |

OTHER PUBLICATIONS

Three photographs showing two styles of clip holders (no date).

Primary Examiner—Jimmy G. Foster
Attorney, Agent, or Firm—Donald L. Beeson

[57] ABSTRACT

A disposable cassette tape holder for securing a cassette tape to a file jacket or document is formed from a single sheet of pliable material having two parallel fold lines which define a front, back and fold panels of the holder. The front and back panels of the holder are folded about the fold lines to form a cassette tape holding pocket and, in one embodiment, the cassette tape is releasably held in the holding pocket, and the holder is in turn secured to the file jacket or document, by a light adhesive applied to the panels of the holder. Depending on the placement of the adhesive, the holder can be adhered directly to the top of a file jacket or document, or the file jacket or document can be interleaved between the holder's back panel and the held cassette tape.

In another version of cassette tape holder of the invention the holder is fabricated of a semi-rigid sheet of plastic or metal material having front and back panels prefolded together to a sufficient closure to require the panels to be pried open to insert a cassette tape.

In yet another version of the invention a foldable holder is formed as an integral extension of a file jacket.

23 Claims, 4 Drawing Sheets

CASSETTE TAPE HOLDER

BACKGROUND OF THE INVENTION

The present invention generally relates to office accessory devices, and more particularly to cassette tape holders for attaching a cassette tape on which dictation has been recorded to an appropriate file jacket or document. It will be appreciated that the invention may also be adapted for use with various other kinds and sizes of cartridge-like containers such as, for example, video cassettes.

Dictating machines using small cassette tapes enjoy widespread use in offices throughout the country. Cassette machines, including the now prevalent hand-held dictation unit, can, for example, record thirty minutes of dictation on a cassette tape measuring roughly 2¼ inches (5.7 cm) by 1¼ inches (3.2 cm) by ¼ inches (0.63 cm).

A user of a cassette tape dictation unit will customarily dictate one or a series of letters, memoranda, or the like and give the small cassette together with the related file or document to a transcribing secretary. To keep the cassette tape from getting lost and physically together with its associated file or document, plastic tape cassette holders have previously been devised. Such prior holder devices generally consist of a molded part having a tape support channel on the front side of the holder and a clip structure on the back.

The present invention provides a disposable cassette tape holder having a comparatively simple structure which eliminates the clipping structure molded on the back side of conventional cassette holders. The invention specifically provides for a cassette tape holder comprised of a single sheet of material which can be folded into a disposable device. A holder device in accordance with the invention can be used once, twice or a few times and then discarded; it also acts to effectively hold a cassette to a paper document or the card stock of a file.

SUMMARY OF THE INVENTION

In accordance with the invention, a holder for attaching a cassette tape to sheet stock, such as a file jacket or piece of paper, is comprised of a single sheet of thin, relatively pliable material divided into a defined front and back panel and an intermediate fold panel. Two parallel fold lines extending across the width of the sheet material and which define the separate panels are spaced apart substantially the thickness of a standard size cassette tape so that the front and back panels can be folded up about the fold lines to form a pocket into which a cassette tape can be inserted. If desired, the cassette may be oriented so that the exposed portion of its enclosed tape abuts against, and is thereby protected by, the inner surface of the intermediate fold panel.

Means are provided for releasably holding the front and back panels of the holder in a folded together position around the inserted cassette tape; means are also provided for holding the cassette tape holder itself to a file jacket or document. In one described embodiment of the invention the pliable material is a sheet of foldable material, such as paper or cardboard, having premarked fold lines. In this embodiment the described means for holding the cassette tape in the cassette holding pocket, as well as the described means for holding the holder and cassette to the sheet stock of a file jacket or document, include the use of light adhesive strips suitably positioned on the sheet material of the holder. Also in this embodiment the foldable sheets from which the holders are formed can be padded together in large numbers to facilitate their use: a user simply peals the foldable sheet off the top of the pad to form a cassette holder as needed.

The light adhesive strips on the foldable embodiment of the invention can be located and utilized in a variety of ways. In one version, the adhesive strips are placed on the inside surfaces of both the front and back panels of the cassette holder whereby the edge of a sheet of paper or file jacket to which the cassette tape is to be held is simply interleaved between the back panel and the cassette tape. In this version the front panel will adhere to the inserted cassette tape and the back panel will adhere to the interleaved paper or file jacket. It is also contemplated that a light adhesive strip could be placed on the back surface of the back panel to permit the tape holder to be adhered to the top surface of a document or file by simply placing the cassette holder's back panel face down against the file or document.

While adhesive strips are shown on the foldable version of the invention as a means of securing the cassette holder to a file or document, it is understood that the invention is not intended to be limited to the use of adhesive strips. Other securement means might include, alternately or in addition, the use of mechanical attachment devices, for example, staples or brads, punch tabs for engaging the sprocket holes of the cassette tape, or additional side retaining tabs to restrain lateral movement of the holder. It is further contemplated that the foldable version of the invention can be made an integral part of a file jacket wherein the edge of the file jacket acts as one of the panels of the holder.

In another embodiment of the invention the cassette tape holder is fabricated of flexible semi-rigid plastic or metal wherein the front and back panels are prefolded along the fold lines to provide a relatively stiff preformed pocket for the cassette tape. In this non-foldable embodiment of the invention, the means for holding the cassette tape in the cassette tape holding pocket is comprised of tensioning the cassette tape holder's front and back panels whereby they clip onto the cassette tape as well as onto sheet stock interleaved between the back panel of the holder and the cassette tape. It is noted that adhesive strips can be used on this version as well. By placing one or more adhesive strips on the back surface of the holder's back panel the holder can be adhered to the top surface of a file or document.

Therefore, it can be seen that the primary object of the present invention is to provide a cassette tape holder which is easy and convenient to use, which can effectively secure a cassette tape to a file jacket or document, yet which can be fabricated and sold at a sufficiently low cost to be essentially disposable.

DESCRIPTION OF THE DRAWINGS

FIG. 6 is a side elevational view of one cassette tape holder from a pad as shown in FIG. 5 folded into an operative holding position around a cassette tape and around an interleaved file jacket or the like.

DETAILED DESCRIPTION OF ILLUSTRATED EMBODIMENTS

Referring now to the drawings, FIGS. 1-4 generally show a pre-bent plastic or metal version of a cassette tape holder in accordance with the invention wherein the cassette tape is held in the cassette tape holder by spring tension in the side panels of the holder. With specific reference to FIGS. 1 and 2, a cassette tape holder, generally denoted by numeral 11, for holding a cassette tape 12 is comprised of a single, elongated sheet of thin, relatively stiff yet pliable plastic or metal material folded together about first and second substantially parallel fold lines A and B, which extend the width of the sheet material, so as to form a front panel 13, a back panel 15, and a bottom fold panel 17. The folded over front, back and bottom fold panels, in turn, form a cassette holding pocket 19; the bottom fold panel of this pocket has a height, h, approximately corresponding to the thickness of a standard sized cassette tape, and the pocket is otherwise dimensioned to approximately correspond to the dimensions of the cassette tape. In its relaxed position the front panel 13 is folded inwardly about fold line A toward the back panel to provide sufficient closure so that the front panel has to be pried open to permit insertion of the cassette tape 12 into the tape holding pocket. The spring tension in the relatively stiff panels 13, 15 when pulled apart will act to clamp the cassette tape in the holding pocket 19, thus providing a means for releasably holding the cassette tape therein.

Figure 1:
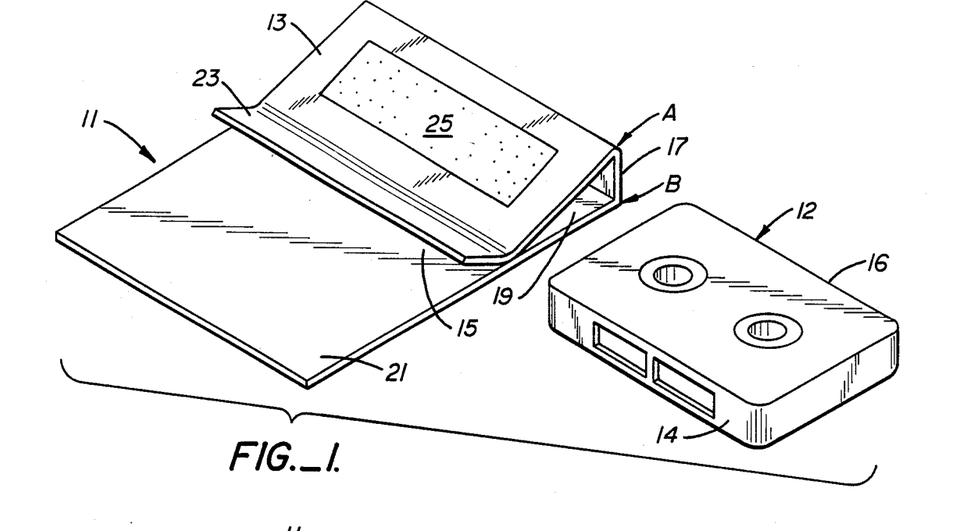
FIG. 1 is a perspective view of a cassette tape alongside a semi-rigid plastic cassette tape holder made in accordance with the invention.
Figure 2:
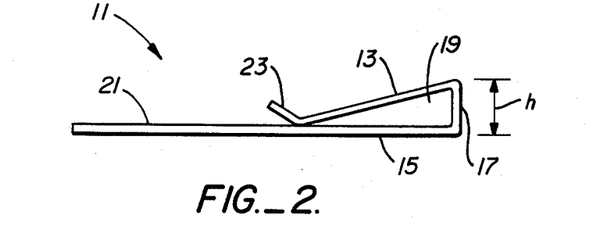
FIG. 2 is a side elevational view of the cassette tape holder shown in FIG. 1.

With further reference to FIGS. 1 and 2, the free end 21 of the back panel 15 extends beyond the free end 23 of the front panel, and the free end of the front panel is bent upwardly to provide a convenient grip for prying the front panel away from the back panel. Also, a writing surface, such as a length of adhesive tape 25, is provided on the face of the front panel to permit the user of the tape holder to jot notes on the face of the holder.

Figure 3:
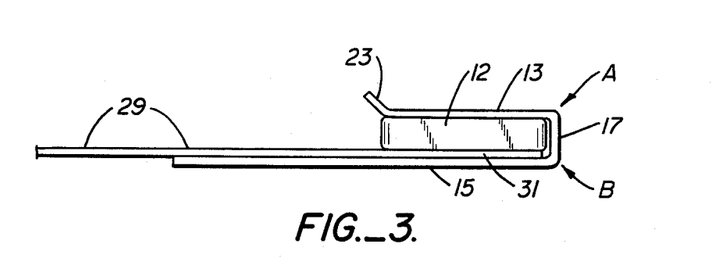
FIG. 3 is a side elevational view of the cassette tape holder of FIG. 1 showing a cassette tape and file jacket or document held therein.

Referring to FIG. 3, means for releasably securing the cassette tape holder 11 and cassette tape 12 to sheet stock 29, such as a file jacket or a document, consists of the tensioned together front and back panels 13, 15 of the holder. By interleaving the end 31 of the sheet stock between the cassette tape 12 and the holder's back panel 15, the spring tension forces in the panels that hold the cassette tape in the tape pocket 19 will also grip the end of the sheet stock.

Molded dimples (not shown) or the like might also be formed on the inside surfaces of the front or back panels 13,15, or both, so as to releasably engage the spocket holes of the cassette tape when the cassette tape is inserted in the cassette tape pocket 19. Such dimples would prevent any tendency of the cassette to slide laterally in the pocket.

Figure 4:
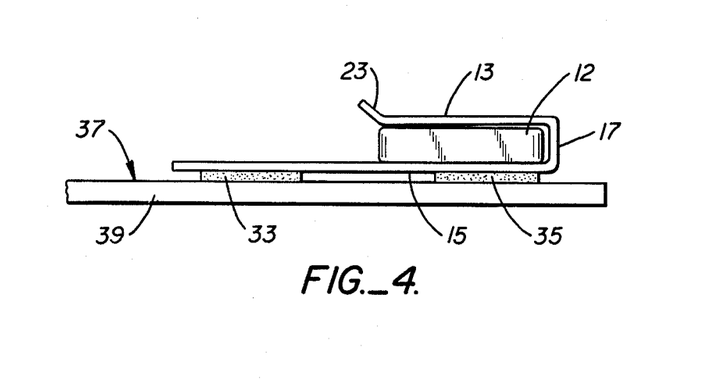
FIG. 4 is a side elevational view of the cassette tape holder shown in FIG. 1 wherein light adhesive strips are provided on the back panel of the holder for adhering the holder to a file jacket or document.

An alternative means for releasably securing the cassette tape holder of FIGS. 1 and 2 to sheet stock is shown in FIG. 4 wherein adhesive strips 33, 35, shown with exaggerated dimensions, are applied across the top and bottom of the outside surface of the back panel 15, such that the holder can be adhered directly to the top surface 37 of the sheet stock 39. These adhesive strips should be of a sufficiently light adhesive to permit the holder to be removed from the file jacket or document without tearing same, yet strong enough to keep the holder and tape from readily falling off the file jacket or document.

Figure 5:
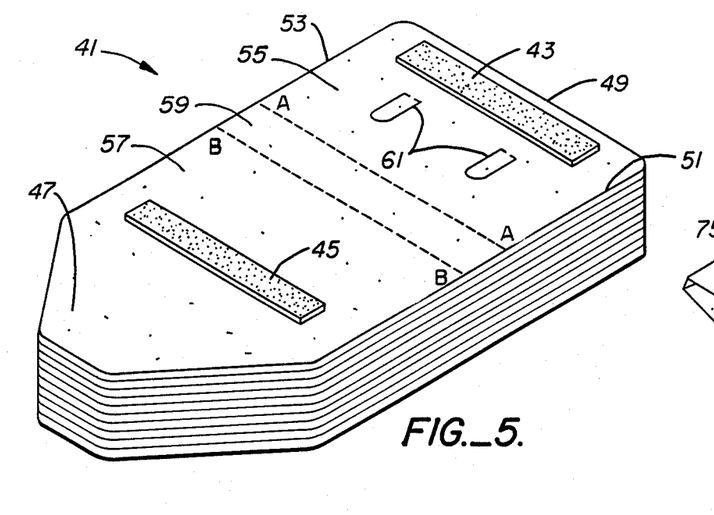
FIG. 5 is a perspective view of a plurality of an alternative version of a cassette tape holder of the invention wherein the holder is formed from foldable sheet material and stacked in a pad of multiple quantities of holders available for individual selection and use.
Figure 6:
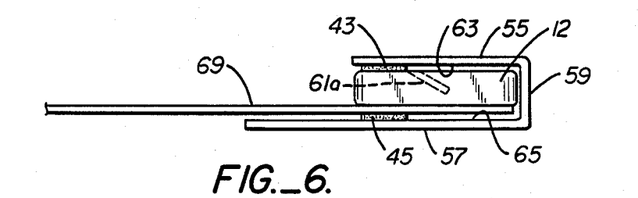
Figure 7:
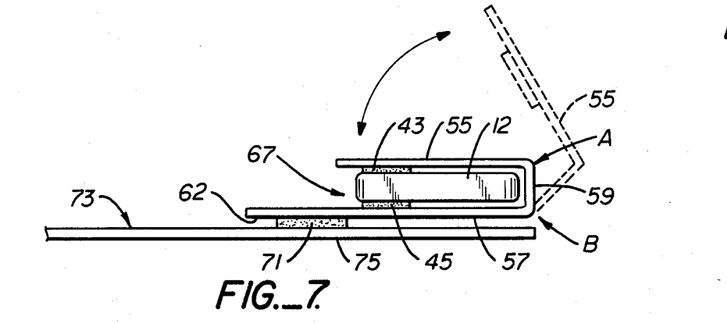
FIG. 7 is a side elevational view of a foldable cassette tape holder such as shown in FIG. 6, wherein the cassette tape is held in the holder by adhesive means, and wherein the cassette tape holder is adhered to the top of a file jacket or document by a separate adhesive on the back panel of the holder.

FIGS. 5-7 generally illustrate a foldable paper version of the cassette tape holder of the invention wherein the user folds the front and back panels of the holder together about premarked fold lines on the sheet material comprising the holder.

FIG. 5 shows a stack of individual unfolded cassette tape holders suitably affixed together into a pad, generally denoted by the numeral 41, by a light adhesive, such as adhesive strips 43 and 45 applied to each individual sheet of the pad. As will be described below, the adhesive strips for padding the holders also serve the function of holding each holder in its operative position around a cassette tape and to a file or document.

Each of the unfolded holders of the pad 41 consists of a single sheet of foldable material, suitably a piece of stiff paper or cardboard, having first and second parallel fold lines A—A and B—B extending between the two longitudinal edges 51, 53, and intermediate the ends 47, 49, of the sheet material. It can be seen that the fold lines A—A and B—B define a front panel 55, back panel 57, and intermediate fold panel 59; the back panel 57 formed in FIG. 6 to the left of the fold line B—B has a tapered trailing edge 47 and is somewhat longer than the front panel 55. As in the semi-rigid plastic or metal version of FIGS. 1-4, the dimensions of the front panel 55 should approximately correspond to the width and length of a standard cassette tape and the width of the fold panel should approximately correspond to the thickness of the cassette.

Two punch out tabs 61 are provided in the middle of the defined front panel of the cassette tape holders of FIGS. 5 and 6 whereby, when the holder is folded about the cassette tape 12, the punch out tabs can be pushed in to engage the sprocket holes of the cassette tape to prevent the cassette from sliding in the cassette holding pocket 67 formed when the back and front panels are folded together about the fold lines A—A and B—B. With suitably sized punch tabs, the punch tabs can be forced into the sprocket holes of the cassette, such as shown by phantom lines 61a in FIG. 6, to physically hold the cassette tape to the front panel of the holder. It is appreciated that, when such punch out tabs 61 are provided in holders fabricated of more rigid material, these tabs will automatically engage with the sprocket holes as the cassette is slid past them into the holding pocket. The cassette tape would then be released from the front panel by physically pulling the cassette tape from the inside of the front panel.

A further means of holding the cassette tape 12 to the folded over front panel 55 of the holder is shown in FIG. 6 wherein an adhesive strip 43 is applied along the inside surface 63 of the front panel to adhere the front panel to one side of the cassette when the cassette is placed into the cassette holding pocket 67. A second adhesive strip 45 is also applied to the inside surface 65 of the back panel 57 of the FIG. 6 embodiment. This second adhesive strip is used to hold the cassette tape holder and the inserted cassette tape to the edge of a file jacket 69 (or document) when, as shown in FIG. 6, the file jacket is interleaved between the back panel 57 and the cassette. Gravity and the relative stiffness of the foldable sheet material from which the holder is formed will in this version tend to keep the cassette tape and front panel to which the cassette tape is adhered in the folded over position shown in FIG. 6. Such interleaving securement of the file jacket or document in the foldable version of the invention would be similar to that shown in the FIG. 3 plastic version, except that the file jacket or document would be held by the cassette tape holder adhesively rather than by the clamping force of the tensioned front and back panels of the holder.

As shown in FIG. 7, an additional back adhesive strip 71 can be applied to the outside surface 62 of the back panel 57 of the padded holders shown in FIG. 5. This back adhesive strip permits the folded over cassette tape holder and cassette to be adhered directly to the top surface 73 of a file jacket or document, denoted as element 75 in FIG. 7. In this operative version, it can be seen that the adhesive strip 45 on the inside of the back panel 57 contacts the bottom side of the cassette tape 12 so that both the front and back panels of the holder adhere to the cassette tape. The general advantage of this version would be that there is a more complete securment of the cassette in the cassette tape holding pocket 67.

Also, illustrated in FIG. 7 is how the front panel 51 and fold panel 53 can be folded to contact and release the cassette tape 12. The phantom lines show the front and fold panels in a partially folded over position and the cassette can easily be inserted or removed when the front panel is in this position.

Figure 7A:
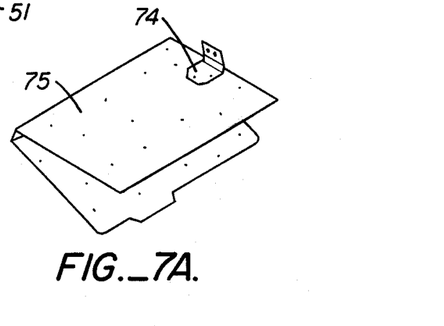
FIG. 7a is a perspective view of a foldable cassette tape holder according to the invention adhered to the top of a file jacket as shown in FIG. 7.

FIG. 7A shows a cassette tape holder 75 according to the FIG. 7 version of the invention adhered to the top surface of a file jacket 76. It is noted that, if one were to eliminate the adhesive strip 71 shown in FIG. 7 on the outside surface 62 of the back panel, the holder 75 could still be secured to the top of the file jacket as shown in FIG. 7A by a user supplied attachment means, such as by stapling or taping.

Figure 8:
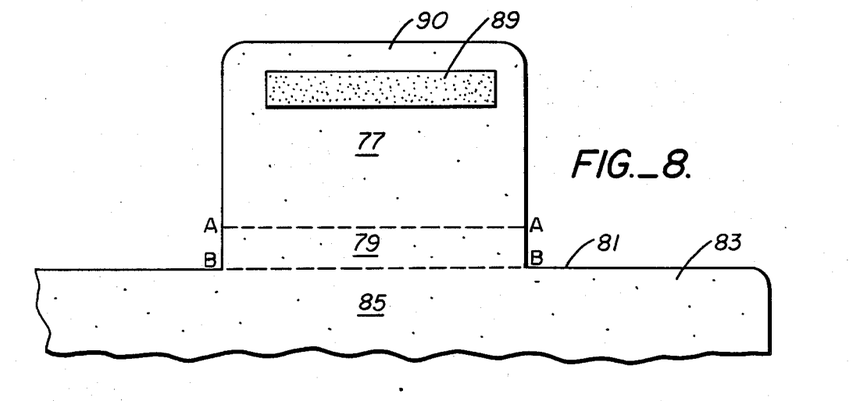
FIG. 8 is a top plan view of a foldable cassette tape holder integrally formed to the edge of a file jacket.
Figure 8A:
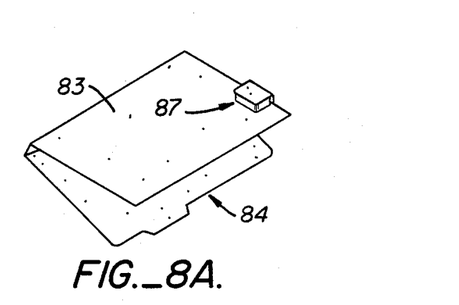
FIG. 8A is a perspective view of a file jacket and integrally formed cassette tape holder as shown in FIG. 8 with a cassette tape held in the holder.

FIGS. 8 through 13, show alternative embodiments of the foldable version of the invention formed as an integral part of a file jacket. In the FIG. 8 embodiment, the holder's front panel 77 and fold panel 79, defined by fold lines A—A and B—B, physically extended from the top edge 81 of a file jacket 83, while the top end area 85 of the file jacket adjacent the fold panel 79 serves as the holder's back panel. As seen in FIG. 8A a cassette tape 12 is held to the file jacket 83 of the file 84 by simply folding the front panel 77 and fold panel 79 about fold lines A—A and B—B to form a cassette tape holding pocket 87 at the top edge of the jacket. An adhesive strip 89 applied on the underside of the front panel near the panels' leading edge 90 will adhesively hold the cassette tape in the pocket. Again it is noted that the dimensions of the front and fold panels 77 and 79 should be chosen to approximately correspond to the dimensions of a standard cassette.

Turning to the embodiment illustrated in FIGS. 9-13 of the drawings, a cassette tape holder formed integrally to a file jacket 91 is comprised of a front panel 93, a fold panel 95 (both of which are defined by fold lines A—A and B—B), two side extension tabs 97, 98 formed on the lateral edges, 101, 103 of the front panel 93, and a front extension tab 99 formed on the center of the front panel's leading edge 105. Each of the extension tabs 97, 98, 99, have fold lines C—C and D—D which, like the fold lines A—A and B—B, have a separation corresponding to the thickness of a standard cassette tape. The area at 107 of the file jacket adjacent the fold panel 95 (which serves as the back panel of the cassette tape holder integrally formed to the jacket), has three tab holes 109, 110, 111, which are positioned to receive the extension tabs 97, 98, 99 when the front panel 77 is folded over a cassette tape.

Figure 9:
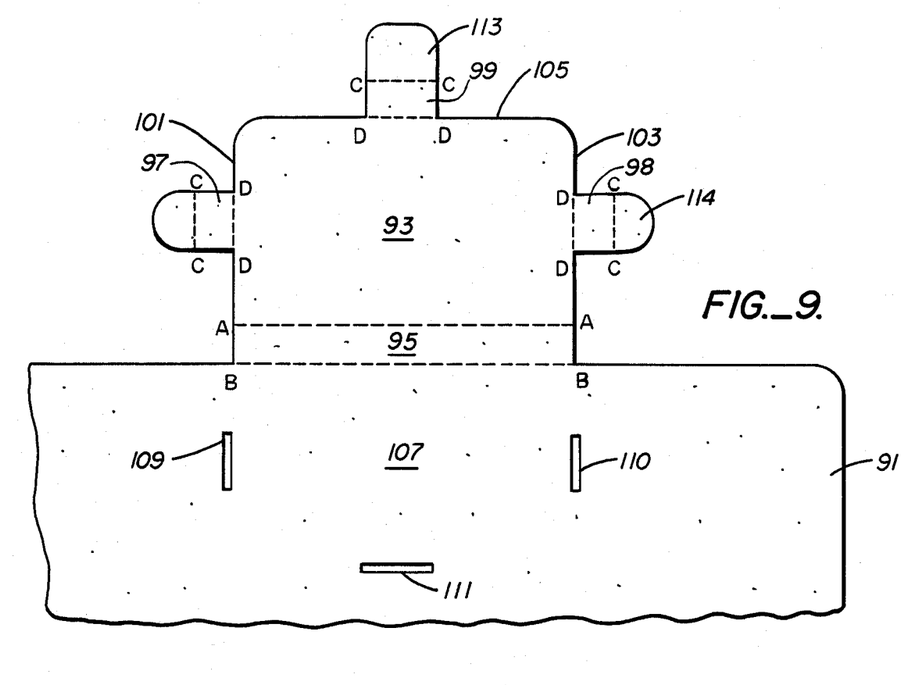
FIG. 9 is a top plan view of an alternative version of an integral cassette tape holder and file jacket as shown in FIG. 8.
Figure 10:
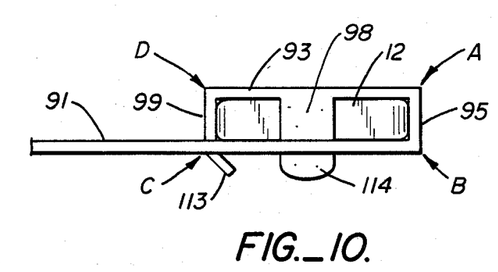
FIG. 10 is a side elevational view of the cassette tape holder of FIG. 9 operatively folded over to hold a cassette tape.
Figure 11:
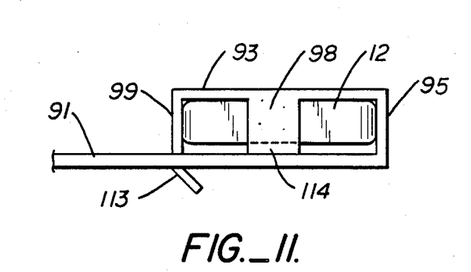
FIG. 11 is a side elevational view of the cassette tape holder of FIG. 9 showing another variation of how the holder can be operatively folded over to hold a cassette tape.
Figure 12:
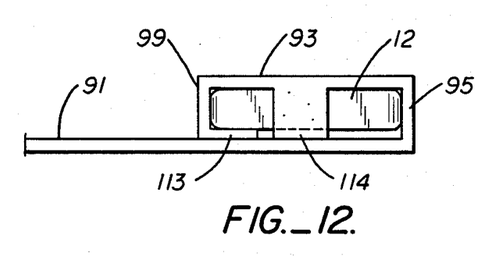
FIG. 12 is a side elevational view of the cassette tape holder of FIG. 9 showing another variation of how the holder can be operatively folded over to hold a cassette tape.

As illustrated in FIGS. 10-12, the integral file jacket tape holder of FIG. 9 can be folded over the cassette tape in a number of alternative ways. With reference to FIG. 10, the front panel 93 can be folded over the cassette tape 12 placed on the file jacket back panel area 107 and the side tabs 97, 98, and the front tab 99 inserted through the three tab holes 109, 110, 111 in the file jacket. In FIG. 10 the folded over corners A, B, C, D, correspond to the fold lines A—A and B—B shown in FIG. 9, and fold lines C—C and D—D of the front tab. It can be seen that when the side and front tabs are inserted through the tab holes, the leading edges 113, 114 of the tabs are bent over slightly to keep the tabs from pulling out.

As illustrated in FIGS. 11 and 12, the leading edges of the tabs, rather than being inserted into tab holes in the file jacket, can instead be folded under the cassette tape 12. In this case a light adhesive is supplied to the undersurface of the folded over tabs so that the tabs adhere to the file jacket. For example, with reference to FIG. 12 adhesive would be applied to the undersurfaces 115, 117, of both of the side tabs 97, 98 and front tab 99. Using an adhesive to hold the tabs to the top surface of the file jacket 91 would permit some or all of the sprocket holes 109, 110, 111 to be eliminated. Adhesive may, if desired, be eliminated from tabs 97 and 98, which would still be held in place by the force exerted by tab 99.

Figure 13:
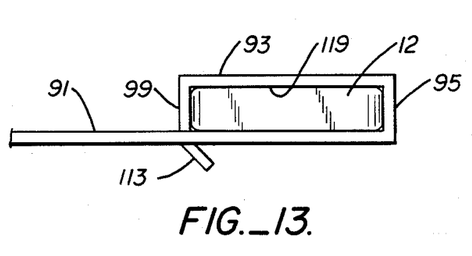
FIG. 13 is a side elevational view of an alternative version of an integral cassette tape holder as shown in FIG. 9 having a single front tab.

The side tabs 97, 98 could also be eliminated as shown in FIG. 13. In this version, an adhesive would be applied to the undersurface 119 of the front panel 93 to keep the cassette tape 12 from sliding laterally within the cassette tape holding pocket. Alternatively, punch tabs 61a could be provided in the front panel 93 for engagement with the sprocket holes in the cassette, as shown in FIG. 6, in order to keep the cassette tape 12 from sliding laterally.

Figure 14:
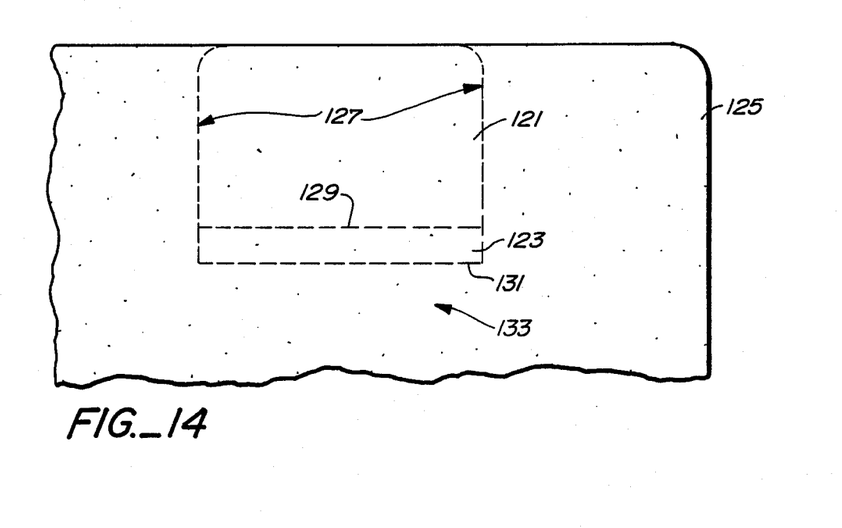
FIG. 14 shows a further embodiment of the invention wherein the cassette tape holder is integrally formed as part of the file pocket, with two perforated lateral edges providing a punch out at the end of the jacket.
Figure 15:
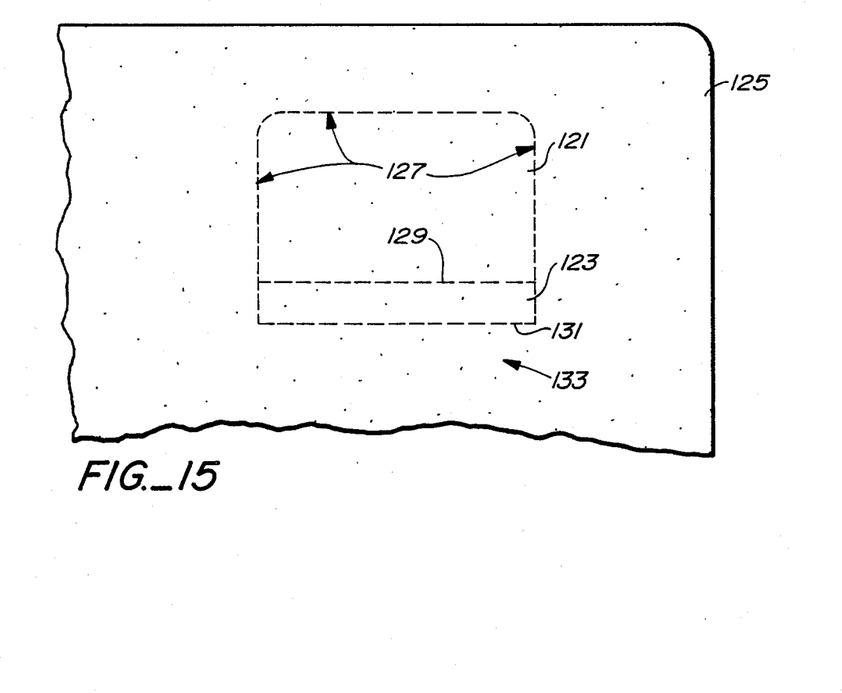
FIG. 15 is a top plan view of the version of the invention shown in FIG. 14, except that all three edges of the holder are formed by perforations in the file jacket.

While the embodiments of the invention illustrated in FIGS. 8–13 show the integral cassette tape holder of a file jacket extending from the edge of the jacket, it can be appreciated that the cassette tape holder could be made as an integral part of the file jacket in other ways. For example, referring to FIGS. 14 and 15, the front and intermediate fold panels 121, 123 could be formed in the file jacket 125 by perforations 127 cut in the file whereby the two panels can be punched out of the file jacket and folded about parallel fold lines 129, 131 over an adjacent surface 133 of the file which serves as the back panel. This would leave a hole in the jacket where the punched out panels are located. A suitable location for the punch out holder would be near the top of the file jacket.

Therefore, it can be seen that the present invention involves a cassette tape holder which is fabricated from a single sheet of material and which because of its low fabrication cost is essentially disposable. The invention in its paper version is adapted to being fabricated in pads where one holder after another can be peeled off, used, and then discarded; the holder is also adapted to being fabricated as an integral part of a file jacket. While the present invention has been described in the foregoing specification in considerable detail, it is understood that the invention shall not be limited to such detail, except as is necessitated by the claims following this specification.

What I claim is:

1. A cassette tape holder for securing a cassette tape to sheet stock, such as a file jacket or document, comprising
    a single sheet of thin, relatively pliable material having a front panel, a back panel, and an intermediate fold panel separating said front and back panels,
    said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held,
    first means for releasably holding a cassette tape in said holding pocket, and
    second separate and distinct means contained within the border of said sheet material for attaching said tape holder to said sheet stock.

2. The cassette tape holder of claim 1 wherein said pliable material has an inside surface and an outside surface forming, respectively, the inside surfaces and outside surfaces of said front, back and intermediate fold panels, and wherein said means for holding a cassette tape in said tape holding pocket includes adhesive means on at least one of the inside surfaces of said front and back panels for adhering at least one of said front and back panels to said cassette tape.

3. The cassette tape holder of claim 1 wherein said foldable material has an inside surface and an outside surface forming, respectively, the inside surfaces and outside surfaces of said front, back and intermediate fold panels, and wherein said means for holding a cassette tape in said tape holding pocket includes adhesive means on the inside surface of said front panel for adhering said front panel to said cassette tape.

4. A cassette tape holder for securing a cassette tape to sheet stock, such as a file jacket or document, comprising
    a single sheet of thin, relatively pliable material having a front panel, a back panel, and an intermediate fold panel separating said front and back panels, and further having an inside and outside surface forming, respectively, the inside surfaces and outside surfaces of said front, back, and intermediate fold panels,
    said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held,
    first means for releasably holding a cassette tape in said holding pocket, and
    second separate and distinct means, including adhesive means on the inside surface of said back panel, for attaching said tape holder to said sheet stock.

5. A cassette tape holder for securing a cassette tape to sheet stock, such as a file jacket or document, comprising
    a single sheet of thin, relatively pliable material having a front panel, a back panel, and an intermediate fold panel separating said front and back panels, and further having an inside and outside surface forming, respectively, the inside surfaces and outside surfaces of said front, back, and intermediate fold panels,
    said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held,
    first means for releasably holding a cassette tape in said holding pocket, and
    second separate and distinct means, including adhesive means on the outside surface of said back panel, for attaching said tape holder to said sheet stock.

6. A cassette tape holder for securing a cassette tape having two sprocket holes to sheet stock, such as a file jacket or document, comprising
    a single sheet of thin, relatively pliable material having a front panel, a back panel, and an intermediate fold panel separating said front and back panels,
    said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held, first means for releasably holding a cassette tape in said holding pocket, including at least one punch out tab formed in at least one of said front and back panels for engaging at least one of the sprocket holes in said cassette tape, and second separate and distinct means for attaching said tape holder to said sheet stock.

7. A cassette tape holder for securing a cassette tape to sheet stock, such as a file jacket or document, comprising a single sheet of thin, relatively pliable material having a front panel, a back panel, and an intermediate fold panel separating said front and back panels, said pliable material having an inside surface and outside surface forming, respectively, inside surfaces and outside surfaces of said front, back and fold panels, said front, back and fold panels being defined by first and second substantially parallel fold lines extending substantially the width of said sheet material, and about which said front and back panels can manually be folded together to form a cassette tape holding pocket, said fold lines being spaced apart approximately the thickness of a standard sized cassette tape, adhesive means on at least one of the inside surfaces of said front and back panels for adhering at least one of said front and back panels to said cassette tape, and adhesive means on the outside surface of said back panel whereby the back panel of said holder can be placed face down against said sheet stock to adhere the holder to said sheet stock.

8. A cassette tape holder for securing a cassette tape to sheet stock, such as a file jacket or document, comprising a single sheet of thin, relatively pliable material having a front panel, a back panel, and an intermediate fold panel separating said front and back panels, and further having an inside and outside surface forming, respectively, the inside surfaces and outside surfaces of said front, back, and intermediate fold panels, said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held, first means for releasably holding a cassette tape in said holding pocket, including adhesive means on the inside surface of said front panel for adhering said front panel to said cassette tape, and second separate and distinct means for attaching said tape holder to said sheet stock, including adhesive means on the inside surface of said back panel whereby said sheet stock, when interleaved between said back panel and a cassette tape inserted into said tape holding pocket, will be adhered to said back panel.

9. A pad of cassette tape holders comprising a plurality of individual cassette tape holders, each being comprised of a foldable sheet of thin, relatively pliable material having a front panel, a back panel, and an intermediate fold panel, said front, back and intermediate fold panels of each holder of said pad of holders being defined by first and second substantially parallel fold lines extending substantially the width of said material, and about which said front and back panels can be folded together to form a cassette tape holding pocket, said fold lines being spaced apart approximately the thickness of the cassette to be held, and each of said holders having adhesive means thereon for releasably holding same together in stacked arrangement and for releasably holding a cassette tape in said tape holding pocket.

10. The pad of cassette tape holders of claim 9 wherein said foldable material of each of said holders has an inside surface and an outside surface forming, respectively, the inside surfaces and outside surfaces of said front, back and intermediate fold panels, and wherein said adhesive means on each of said holders is provided on the inside surface of said front panel and the inside surface of said back panel thereof.

11. The pad of cassette tape holders of claim 10 wherein said adhesive means on each of said holders is further provided on the outside surface of said back panel thereof.

12. The pad of cassette tape holders of claim 10 wherein the individual holders thereof are made of relatively stiff paper.

13. A file folder comprising a planar file jacket, and a cassette tape holder secured in substantially co-planar relation to said file jacket, said cassette tape holder being comprised of a single sheet of thin, relatively pliable material having a front panel, a back panel, and an intermediate fold panel separating said front and back panels, said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held, means separate from the securement of the tape holder to the file jacket for releasably holding a cassette tape in said cassette tape holding pocket.

14. The file folder of claim 13 wherein said foldable material has an inside surface forming, respectively, the inside surfaces of said front, back and intermediate fold panels, and wherein said means for holding a cassette tape in said cassette tape holding pocket includes adhesive means on the inside surface of said front panel for adhering said front panel to said cassette tape.

15. The file folder of claim 13 wherein said file jacket has a defined edge and said cassette tape holder is integrally formed on said defined edge as a planar but foldable extension thereof, said foldable extension being narrower than the width of the longest edge of said file folder.

16. The file folder of claim 15 wherein the second fold line of said holder separates the back and intermediate fold panels thereof and extends substantially along the defined edge of said file jacket whereby said foldable extension consists of said front and intermediate fold panels, and whereby the back panel of said holder is formed by the area of said file jacket adjacent said foldable extension.

17. A file folder comprising
a planar file jacket having a defined edge, and
a cassette tape holder integrally formed on said defined edge as a planar but foldable extension thereof, said foldable extension being narrower than the width of the longest edge of said file folder,
said cassette tape holder being comprised of a single sheet of thin, relatively pliable material having a front panel, a back panel, and an intermediate fold panel separating said front and back panels,
said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held, and
means for releasably holding a cassette tape in said cassette tape holding pocket, said means including at least one extension tab extending from at least one edge of the front panel of said holder and at least one tab hole formed in the back panel area of said file jacket and being located to receive said front panel extension tab when the front and fold panels of said holder are folded over a cassette tape inserted in said tape holding pocket.

18. A file folder comprising
a planar file jacket having a defined edge, and
a cassette tape holder integrally formed on said defined edge as a planar but foldable extension thereof, said foldable extension being narrower than the width of the longest edge of said file folder,
said cassette tape holder being comprised of a single sheet of thin, relatively pliable material having a front panel, a back panel, and an intermediate fold panel separating said front and back panels,
said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held and said second fold line separating said back and intermediate fold panels and extending substantially along the defined edge of said file jacket whereby said foldable extension consists of said front and intermediate fold panels and whereby the back panel of said holder is formed by the area of said file jacket adjacent said foldable extension, said front panel further being defined by a leading edge and two lateral edges, and
means for releasably holding a cassette tape in said cassette tape holding pocket including an extension tab on each of the leading and lateral edges of said front panel and correspondingly located tab holes in the back panel area of said file jacket for receiving said extension tabs.

19. A file folder comprising
a planar file jacket having a defined edge, and
a cassette tape holder integrally formed on said defined edge as a planar but foldable extension thereof, said foldable extension being narrower than the width of the longest edge of said file folder,
said cassette tape holder being comprised of a single sheet of thin, relatively pliable material having a front panel, a back panel, and an intermediate fold panel separating said front and back panels,
said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held, and
means for releasably holding a cassette tape in said cassette tape holding pocket including at least one extension tab extending from at least one edge of the front panel of said holder and adhesive means applied to said extension tab whereby said extension tab can be folded under a cassette tape inserted into said tape pocket and adhered to the top of said file jacket.

20. A file folder comprising
a planar file jacket having a defined edge, and
a cassette tape holder integrally formed on said defined edge as a planar but foldable extension thereof, said foldable extension being narrower than the width of the longest edge of said file folder,
said cassette tape holder being comprised of a single sheet of thin, relatively pliable material having a front panel having a leading edge and two lateral edges, a back panel, and an intermediate fold panel separating said front and back panels,
said front, back and fold panels being defined by first and second substantially parallel fold lines extending substantially the width of said sheet material, and about which said front and back panels can manually be folded together to form a cassette tape holding pocket, said fold lines being spaced apart approximately the thickness of the cassette to be held, said front panel further being defined by a leading edge and two lateral edges with an extension tab provided on each of said edges, and
means for releasably holding a cassette tape in said cassette tape holding pocket.

21. A file folder comprising
a file jacket of a thin, relatively pliable material, and,
a cassette tape holder having front, back and fold panels defined by first and second substantially parallel fold lines extending substantially the width of the cassette tape holder, and about which said front and back panels can be folded together to form a cassette tape holding pocket, said fold lines being spaced apart approximately the thickness of the cassette tape to be held,
said cassette tape holder further being defined by a leading edge and two lateral edges and being integrally formed within the file jacket material, wherein at least one of said leading and lateral edges is defined by perforations cut in said file jacket.

22. The file folder of claim 21 wherein said file jacket has a defined edge which is coincident with the third said edge of said holder.

23. The file folder of claim 21 wherein the third said edge of the holder is further defined by perforations cut in the file.

* * * * *